May 1, 1956 — T. V. MOORE — 2,744,064
RE-ENTRANT COOLING REACTOR
Filed June 14, 1946 — 3 Sheets-Sheet 1

Inventor: Thomas V. Moore

May 1, 1956 T. V. MOORE 2,744,064
RE-ENTRANT COOLING REACTOR
Filed June 14, 1946 3 Sheets-Sheet 2

Witnesses:
Herbert E. Metcalf
John H. Leonard

Inventor:
Thomas V. Moore
By: Robert A. Lavender
Attorney.

May 1, 1956 — T. V. MOORE — 2,744,064
RE-ENTRANT COOLING REACTOR
Filed June 14, 1946 — 3 Sheets-Sheet 3

Witnesses:
Herbert E. Metcalf
John H. Leonard

Inventor:
Thomas V. Moore
By Robert A. Lavender
Attorney

United States Patent Office 2,744,064
Patented May 1, 1956

2,744,064

RE-ENTRANT COOLING REACTOR

Thomas V. Moore, Jackson Heights, N. Y., assignor to the United States of America as represented by the United States Atomic Energy Commission Application June 14, 1946, Serial No. 676,648

1 Claim. (Cl. 204—193)

This invention relates to neutronic reactors, and particularly to cooling aparatus for neutronic reactors of the water cooled slurry or solution types.

In neutronic reactors of the water cooled slurry or solution type, the reactive slurry or solution is contained in a tank and cooling is effected by passing coolant through thin walled aluminum tubes which extend through the opposite sides or opposite ends of the tank. The same is true of the water cooled fluid moderator type reactor such as one employing heavy water ($D_2O$) as a moderator.

In such reactors, great difficulty has been encountered in providing effective seals between the tubes and the walls of the container below the liquid level.

On the of the principal objects of the present invention is to provide a combined shielding cover and cooling tube arrangement for a neutronic reactor by which coolant can be circulated effectively through the slurry solution, or fluid moderator without the necessity for passing the coolant through the side wall or bottom of the container.

A more specific object is to cool reactors of the type described by means of reentrant tubes which extend into the slurry solution, or fluid moderator in the reactor tank through a hollow iron cover of the tank and discharge into suitable discharge passages in the cover.

Other objects and advantages will become apparent from the following description wherein reference is made to the drawings in which Fig. 1 is a diagrammatic perspective view of a neutronic reactor tank of the kind referred to embodying the principles of the present invention;

Neutronic reactors are fully described in U. S. Patent 2,708,656 of Fermi and Szilard, dated May 17, 1955, to which reference is made for structural details, sizes and operation, and, hence, reactors are illustrated herein diagrammatically only.

Figure 1:
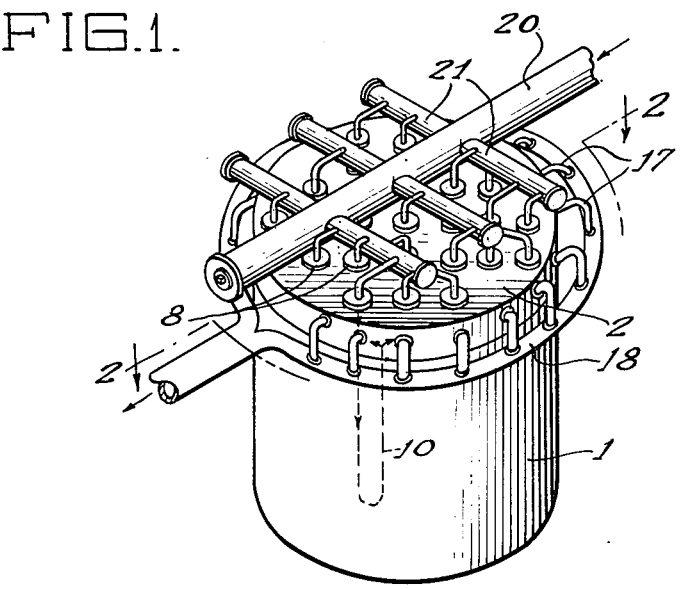
Figure 2:
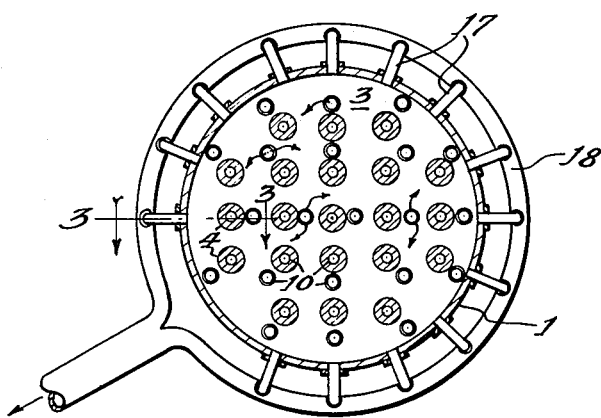
Fig. 2 is a horizontal cross sectional view taken on line 2—2 of Fig. 1.
Figure 3:
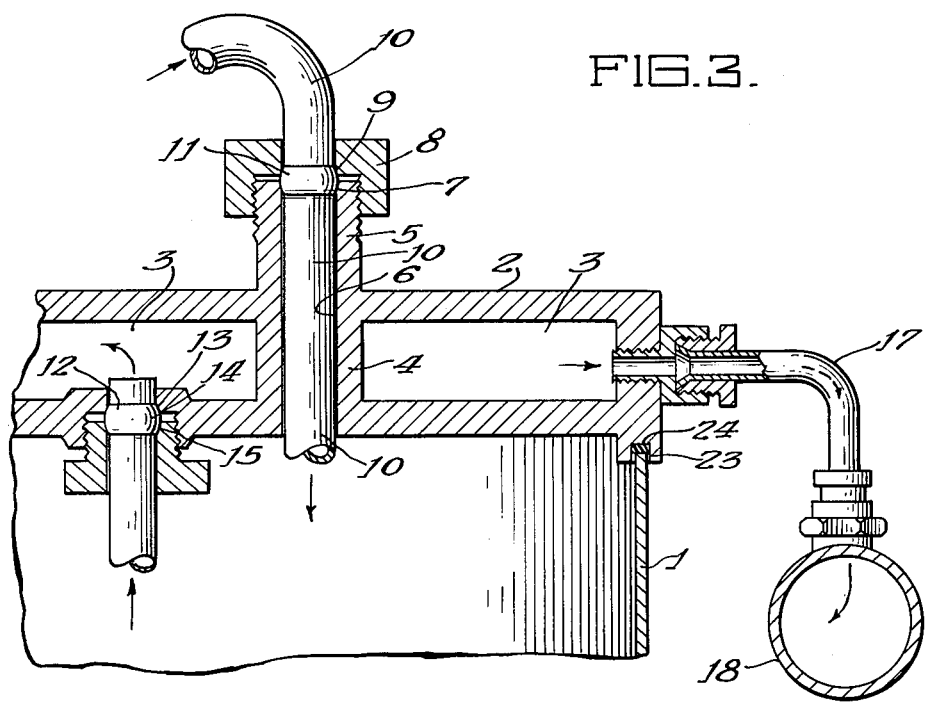
Fig. 3 is an enlarged fragmentary vertical sectional view taken on line 3—3 of Fig. 2.

Refering to the drawings, a slurry or solution type reactor is illustrated in Figs. 1–3, and comprises a container or tank 1 of suitable size which preferably is composed of stainless steel. The tank 1 is filled to within a few inches of the top with the active slurry or solution.

The coolant tubes generally used are aluminum and have very thin walls so as not to reduce the reproduction factor of the reactor unduly. Consequently, it is difficult to provide an effective seal between the circumferential walls of the coolant tubes and the side wall or bottom of the tank 1. It is apparent that the difficulty of providing sealed joints between the tank walls and so large a number of tubes with assurance that there will be no leakage around any one of them is quite pronounced when consideration is given to the fact that such reactors not infrequently employ hundreds of cooling tubes.

In order to eliminate the necessity for such joints, a hollow iron or steel cover 2 for the tank 1 is provided. The cover 2 has top and bottom walls and a side wall extending about the edges of the top and bottom walls and joining the same so as to form a cavity 3 (Fig. 3) through which extend hollow columns 4 which are integral with the top and bottom walls.

Each column 4 has an end portion or boss 5 which extends above the top wall. A central bore or passage 6 extends through the boss 5 and column 4, and is open at both ends to receive the inlet end of a reentrant cooling tube.

The upper end of the boss 5 has an internal annular clamping shoulder 7 and is externally threaded for cooperation with a binding nut 8 which has an annular clamping shoulder 9.

A coolant tube 10 is in the shape of a U, one leg of which extends through each bore 6 and is provided with the usual clamping seal 11 which is engaged by the shoulders 7 and 9 and compressed thereby to secure the tube 10 at its upper or inlet end to the cover 2 and to form a seal between the tube 10 and wall of the passage 6.

The said leg of each tube 10 extends downwardly into the tank 1 below the liquid level to adjacent the bottom, and the other leg extends upwardly therefrom back to the cover 2, being provided with the usual spherical integral sealing portion 12, going into an opening 13 in the bottom of the cover, and being clamped between the sealing shoulder 14 of the cover and a cooperating shoulder 15 of a clamping nut 16 which is in threaded engagement with the cover. The tube 10 discharges into the cavity 3 of the cover 2. Suitable outlet pipes 17 are connected in openings in the side wall spaced about the cover 2 to discharge the coolant from the cavity 3 into a circular discharge header 18. Coolant is supplied to the tubes 10 by a main source pipe 20 and feeder pipes 21 (Fig. 1), which are connected with the legs of the tubes 10, which are sealed in the hollow columns 4 of the cover.

By the use of reentrant tubes such as described, no seals are necessary in the tank side walls or bottom, and the coolant water and cover 2 are utilized as a biological shield.

The cover 2 preferably has an annular downwardly directed open channel 23 for receiving the upper edge of the tank 1, a suitable sealing gasket 24 being provided to exclude moisture from the tank.

Figure 4:
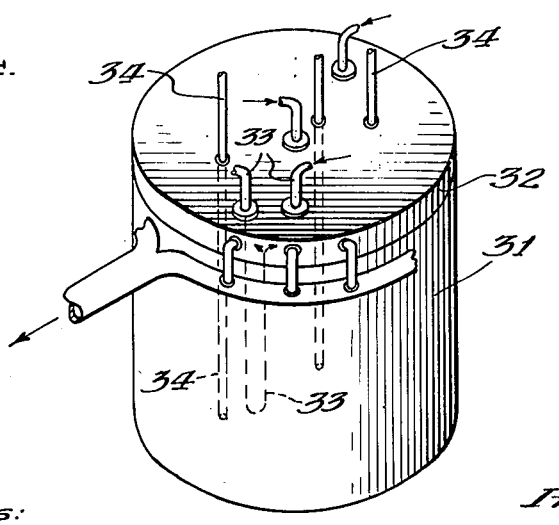
Fig. 4 is a diagrammatic perspective view of a modified form of reactor.

As illustrated in Fig. 4, the principles of the present invention may be applied to a liquid moderator type of reactor. In this type of reactor a tank 31 is utilized, which is filled with $D_2O$ to the required depth. The tank 31 has a plurality of reentrant cooling tubes 33 as above described and also a plurality of rods 34 which are suspended in the heavy water moderator.

The rods 34 in that portion disposed within the moderator are of fissionable material, such as natural uranium, and are sealed in aluminum jackets in intimately bonded relationship. Control and safety rods of neutron absorbing material, such as cadmium or boron which may be inserted into the reactor or withdrawn therefrom the amount desired for controlling the operation or power production of the reactor are provided (not shown). In such a reactor, the heat from the rods 34 is transferred to the liquid moderator, retransferred from the moderator to the reentrant tubes by direct contact, and then passed into the coolant in the tubes.

In either of the above types of reactor, power driven means may be installed in the tanks to circulate the slurry or solution, or moderator so as to increase the rate of heat exchange.

Figure 5:
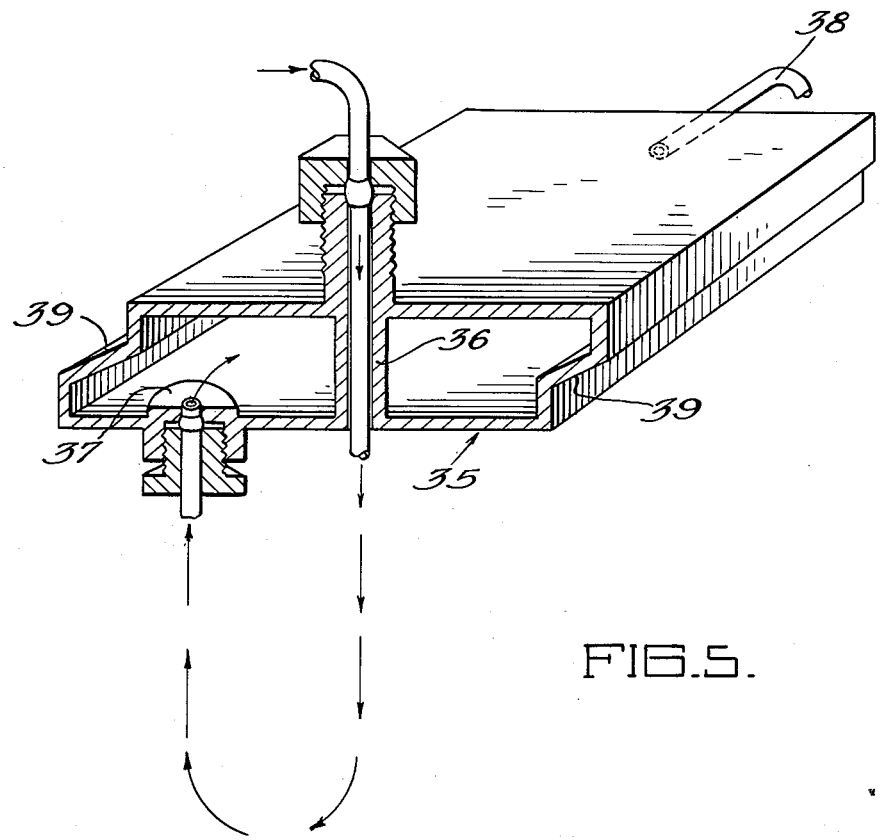
Fig. 5 is an enlarged fragmentary view, partly in section of a modified cover for the reactors illustrated in Figs. 1 and 4.

Instead of a single cover as described, the cover may be in sections as illustrated in Fig. 5. In this form of sectional cover, each section 35 has a plurality of columns 36, similar to the columns 4 and for the same purposes, and receives the discharge ends of the associated tubes, as indicated at 37, in the same manner as the cover 2.

A discharge pipe 38 is provided at each end of each section for connection to a discharge header (not shown). Each lateral face of each cover section 35 is formed of portions, in offset planes with a shoulder 39 joining the offset portions, the shoulder of one lateral face facing in the opposite direction from the shoulder of the opposite face of the same section. Thus when the sections 35 are laid together to cover a tank, the joints therebetween are broken, shielded to some extent by water, and cooled more effectively.

Having thus described the invention, I claim it as follows:

A neutronic reactor comprising a tank open at its top, a body of liquid moderator and thermal neutron fissionable material disposed within the tank, a hollow cover closing the tank and comprising spaced top and bottom walls, a side wall extending about the edges of the top and bottom walls and joining them, and hollow columns extending between the top and bottom so as to form passages through the cover, the bottom wall having a plurality of openings separate from the passages formed by the hollow columns and equal in number thereto; a plurality of U-tubes equal in number to the hollow columns, each U-tube being located in the tank and having one leg of the U connected to an opening in the bottom wall of the cover and the other leg of the U-tube sealed in a hollow column so as to close the passage therein and provide a path for liquid coolant from the exterior of the tank through the cover and from the interior of the tank to the interior hollow within the cover; outlet pipes connected to openings in the side wall spaced about the cover and projecting exteriorly thereof; a discharge header extending around the cover and connected to the outlet pipes; a main liquid coolant source pipe above the top wall of the cover; and means connecting the main source pipe with passages through the hollow columns, wherewith liquid coolant is passed from the main source pipe through the cover into the U-tubes within the tank, then into the hollow cover and finally out through the discharge manifold, whereby the liquid coolant is utilized as radiation shielding during its passage through the hollow cover.

References Cited in the file of this patent

UNITED STATES PATENTS

| | | |
|---|---|---|
| 215,572 | Chase | May 20, 1879 |
| 653,823 | Shimer | July 17, 1900 |
| 1,104,776 | Clark | July 28, 1914 |
| 1,817,978 | Feldmeier | Aug. 11, 1931 |
| 1,835,046 | Hickey et al. | Dec. 8, 1931 |
| 1,975,227 | Eldridge | Oct. 2, 1934 |

FOREIGN PATENTS

| | | |
|---|---|---|
| 233,011 | Switzerland | Oct. 2, 1944 |

OTHER REFERENCES

Elementary Steam Power Eng., MacNaughton, J. Wiley Sons, New York (1923) p. 165.

Elements of Steam and Gas Power Eng., Potter et al., McGraw-Hill, New York (1930), pp. 218 and 331.

Kelly et al.: The Physical Review, vol. 73 (1948), pp. 1135–1139.

Nuclear Reactor Development, Atomic Industrial Forum, Inc., New York 16, N. Y., O. Townsend and E. Wiggins (July 1954), pp. 18–19.